(12) United States Patent  
Kumeda

(10) Patent No.: US 6,480,945 B2  
(45) Date of Patent: Nov. 12, 2002

(54) METHOD AND APPARATUS FOR CONTROLLING MEMORY ACCESS BY A PLURALITY OF DEVICES

(75) Inventor: Yasuo Kumeda, Yokohama (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 09/350,624

(22) Filed: Jul. 9, 1999

(65) Prior Publication Data

US 2002/0026565 A1 Feb. 28, 2002

(30) Foreign Application Priority Data

Jul. 10, 1998 (JP) .......................................... 10-195468

(51) Int. Cl.$^7$ .......................... G06F 12/14; G06F 13/14
(52) U.S. Cl. ....................... 711/163; 711/147; 710/200; 709/213; 713/200
(58) Field of Search ................................ 711/133, 159, 711/163–164, 154, 147, 152; 713/155, 165, 166, 167, 171, 193, 182–185, 200–202, 190–191; 710/200; 709/213

(56) References Cited

U.S. PATENT DOCUMENTS 5,375,243 A * 12/1994 Parzych et al. ............. 713/202
5,719,941 A * 2/1998 Swift et al. ................... 380/25

* cited by examiner

*Primary Examiner*—Matthew Kim
*Assistant Examiner*—Denise Tran
(74) *Attorney, Agent, or Firm*—Blakely, Sokoloff, Taylor & Zafman LLP

(57) ABSTRACT

When each access apparatus is to update its own data written in a common memory device, the transmitting unit of each access apparatus transmits the previous data previously written in the memory device and new data to be newly written in the memory device as a pair of data via a bus. Upon receiving the pair of data from the access apparatus, a determination unit in the common memory device determines whether the data stored in a memory coincides with the previous data received from the access apparatus. If these two data coincide with each other, the data in the memory is rewritten into the new data; otherwise, a data update in the memory is rejected.

2 Claims, 3 Drawing Sheets

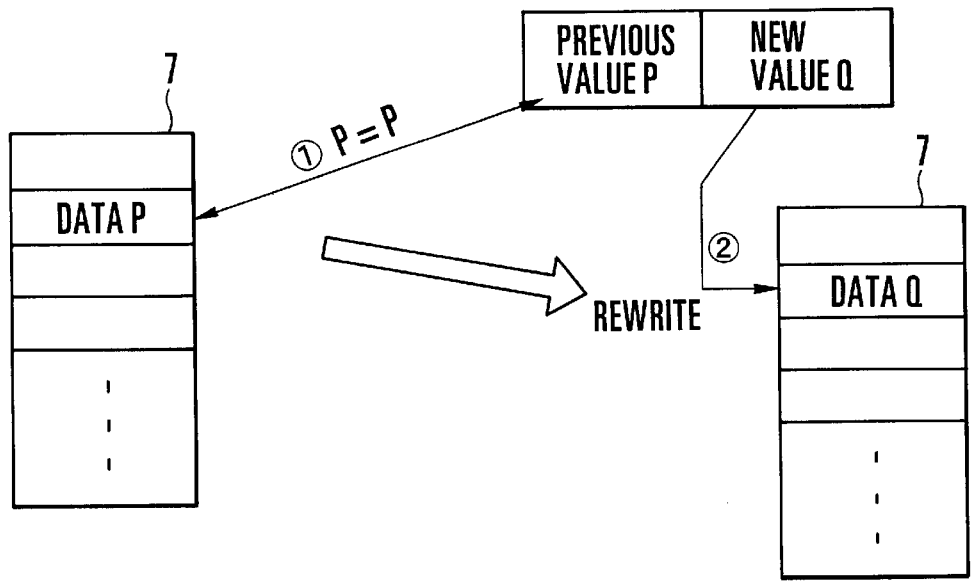
F I G. 3 A
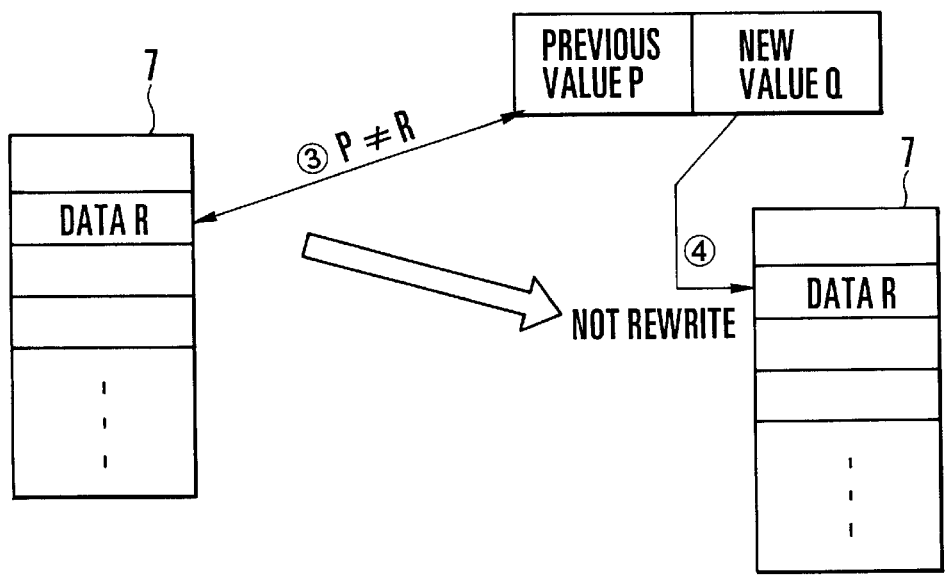
F I G. 3 B

METHOD AND APPARATUS FOR CONTROLLING MEMORY ACCESS BY A PLURALITY OF DEVICES

BACKGROUND OF THE INVENTION

The present invention relates to a control method for a common memory device on a network, and a memory system made up of the common memory device and a plurality of access apparatuses for writing data in the common memory device.

A known memory system of this type comprises a plurality of computers connected to a network and used as access apparatuses, and a memory device such as a hard disk connected to the network and accessed by each computer via the network to rewrite data. Another known system comprises a plurality of CPUs (Central Processing Units) connected to a CPU bus, and a RAM (Random Access Memory) accessed by each CPU via the bus to rewrite data. Still another known system comprises a plurality of memory-accessible cards connected to a back plane bus, and a memory device commonly accessed by the cards to rewrite data.

Hardware or software exclusively controls these memory systems to avoid contention of access from each memory access apparatus to the common memory device.

In exclusive control by hardware, an exclusive control flag is arranged at a connection portion between the common memory device and each memory access apparatus. A given memory access apparatus, which accesses the common memory device, sets the flag for itself, writes data in the common memory device, and resets the flag at the end of write access. While the given memory access apparatus accesses the common memory device, other memory access apparatuses are inhibited from accessing the common, memory device.

In exclusive control by software, a flag area is allocated in part of a memory in the common memory device. A given memory access apparatus, which accesses the common memory device, sets the flag for itself, writes data in the common memory device, and resets the flag at the end of write access.

In exclusive control by hardware, it is difficult to accurately set the flags in response to flag setting requests from a plurality of memory access apparatuses operating asynchronously at high speed. When the respective memory access apparatuses output flag setting requests, no flags corresponding to the apparatuses may be set, or some flags for the corresponding apparatuses may be set. The exclusive control by hardware requires a logic circuit for confirming whether each flag is correctly set or reset, resulting in a complicated hardware arrangement. When a memory access apparatus, which has set the flag, does not reset the flag, the common memory device cannot be used. A means for monitoring this state and restoring the memory accessible state must be arranged to result in a complicated hardware arrangement. The common memory device can process a request from only one memory access apparatus at a time. Other memory access apparatuses, which have accessed the common memory device simultaneously with the currently accessing apparatus, must wait for data rewrite. The processing efficiency undesirably decreases.

The exclusive control by software requires a process for preventing contention between a given memory access apparatus and other memory access apparatuses when the given memory access apparatus sets its own flag in the flag area in the common memory device. This complicates a software process. When the memory access apparatus, which has set the flag, does not reset the flag, the common memory device cannot be used. A processing means for appropriately monitoring such a flag state and restoring the memory accessible state is required. This also complicates the software process.

SUMMARY OF THE INVENTION

It is an object of the present invention to allow rewriting data in a common memory device for a plurality of memory access apparatuses without complicating a hardware arrangement and software process and prevent a decrease in processing efficiency of memory access apparatuses in rewriting data.

In order to achieve the above object of the present invention, there is provided a memory device control method comprising the first step of causing a first access apparatus to transmit first data previously written and second data to be newly written as a pair of data to a memory device which stores data corresponding to a plurality of access apparatuses including the first access apparatus, the second step of determining whether data stored in correspondence with the first access apparatus coincides with the first data when the memory device receives the pair of data, and the third step of allowing writing the second data in the memory device when the data stored in the memory device coincides with the first data, and rejecting to write the second data when the data stored in the memory device does not coincide with the first data.

BRIEF DESCRIPTION OF THE DRAWINGS

FIG. 3A is a view for explaining data rewrite operation of the common memory device when it is determined that a previous data value coincides with a new data value; and FIG. 3B is a view for explaining data rewrite operation of the common memory device when it is determined that the previous data value does not coincide with the new data value.

DESCRIPTION OF THE PREFERRED EMBODIMENT

The preferred embodiment of the present invention will be described below in detail with reference to the accompanying drawings.

Figure 1:
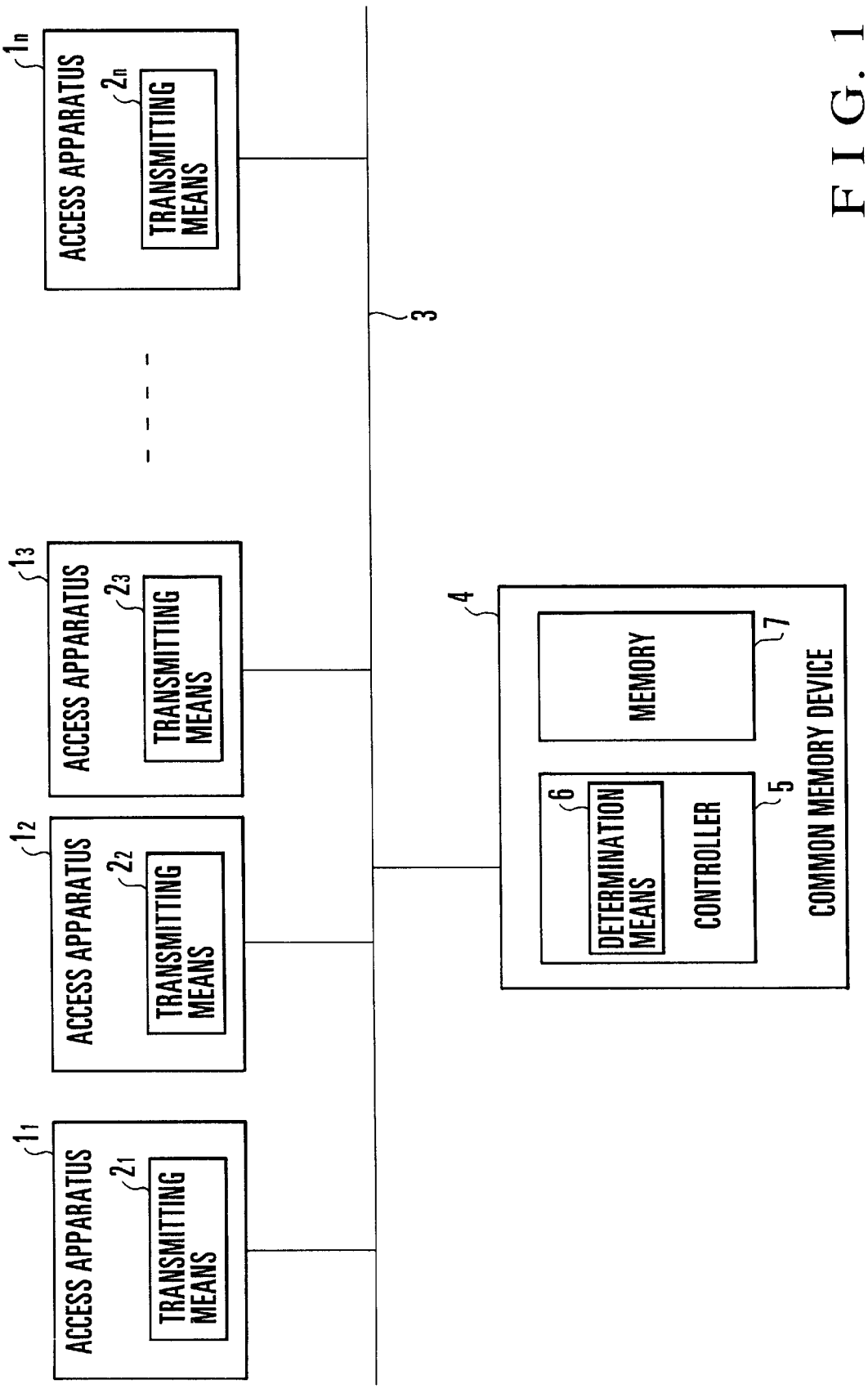
FIG. 1 is a block diagram showing the arrangement of a memory system according to the present invention.

As shown in FIG. 1, a memory system of the present invention comprises a plurality of access apparatuses $1_1$ to $1_n$ connected to a bus 3 and a common memory device 4 connected to the bus 3 and commonly accessed by the access apparatuses $1_1$ to $1_n$ via the bus 3 to rewrite data. Note that the bus 3 may be a LAN (Local Area Network), WAN (Wide Area Network), or the like.

The access apparatuses $1_1$ to $1_n$ comprise transmitting means $2_1$ to $2_n$ (to be described later), respectively. The common memory device 4 comprises a controller 5 having a determination means 6 (to be described later) to control data read and write access, and a memory 7 for storing data.

The access apparatuses $1_1$ to $1_n$ address the memory 7 in the common memory device 4 to write and store the data in it.

Assume that data transmitted from each of the access apparatuses $1_1$ to $1_n$ and stored in the memory 7 is rewritten. Each access apparatus outputs the previous data, its address, and new data to be rewritten from a corresponding one of the transmitting means $2_1$ to $2_n$ to the common memory device 4 via the bus 3.

The controller 5 in the common memory device 4 receives the previous data, its address, and new data from the corresponding access apparatus. The determination means 6 in the controller 5 compares the data read out from the memory 7 with the previous data received from the corresponding access apparatus. If these data coincide with each other, the controller 5 rewrites the data inch memory 7, with the new data.

Figure 2A:
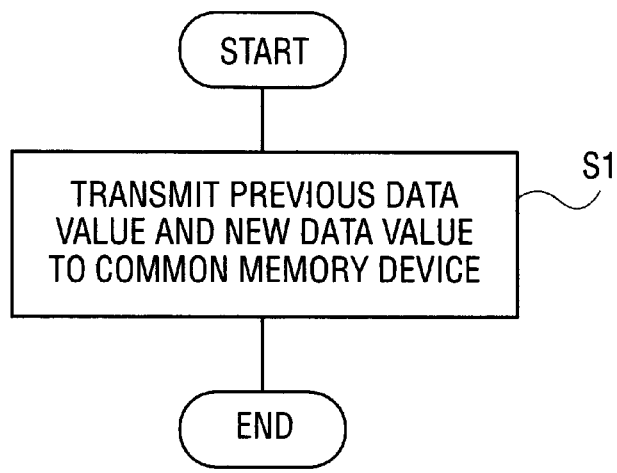
FIG. 2A is a flow chart showing the main operation of an access apparatus constituting the memory system of the present invention.

The main operations of the present invention will now be described in detail with reference to the flow charts in FIGS. 2A and 2B.

Assume that data of each access apparatus, which is written in the memory 7 of the common memory device 4, is rewritten into new data. In step S1 of FIG. 2A, the first access apparatus, one of the access apparatuses $1_1$ to $1_n$, transmits the previous data written in the memory 7 by the first access apparatus, the address of the data, and data to be newly written in the memory 7 from the transmitting means $2_1$ to the common memory device 4 via the bus 3. The first access apparatus thus requests a memory change to the common memory device 4.

When the first memory access apparatus has made the memory change request to the common memory device 4, and the transmitting means $2_1$ transmits the data, the common memory device 4 receives these transmitted data.

Figure 2B:
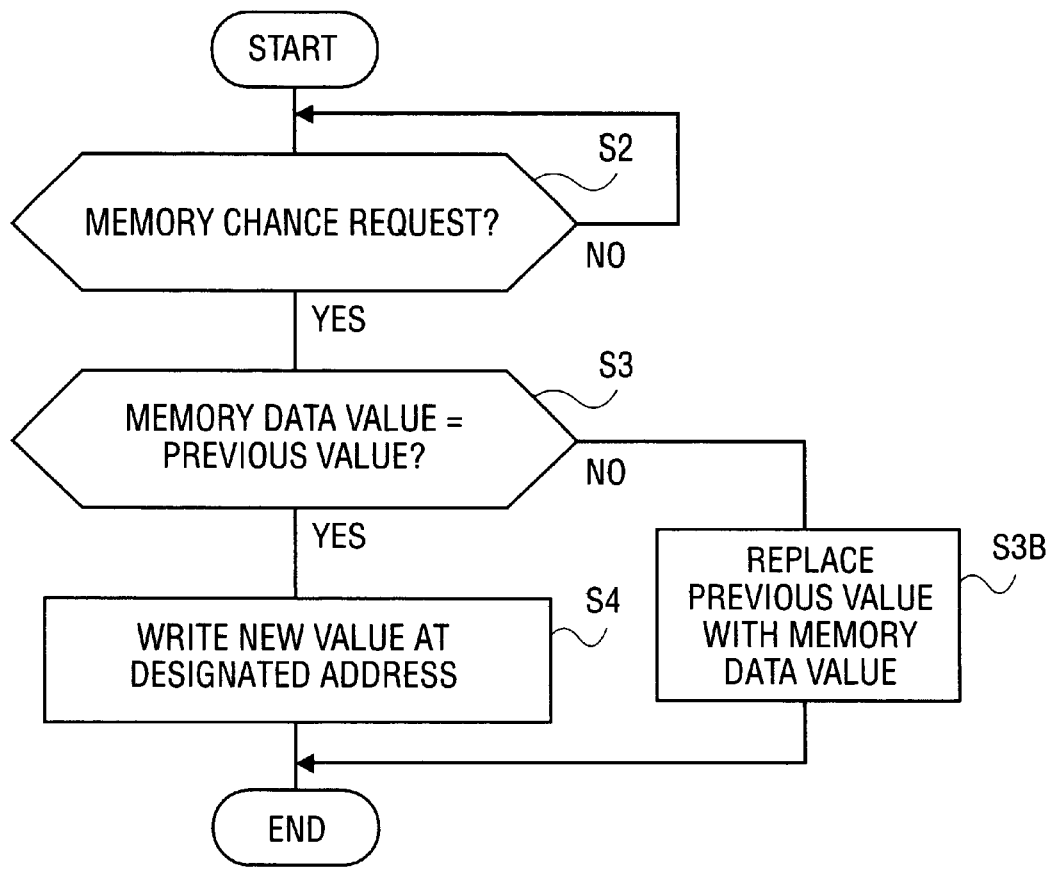
FIG. 2B is a flow chart showing the main operation of a common memory device constituting the memory system of the present invention.

In this case, the controller 5 in the common memory device 4 determines "memory change request?" as "YES" in step S2 of FIG. 2B. The controller 5 then reads out the data from the corresponding address of the memory 7. The determination means 6 determines in step S3 whether the data read out from the memory 7 coincides with the previous data received from the first access apparatus. When the two data values coincide with each other, "YES" is obtained in step 3, and the controller 5 rewrites the data at the above address of the memory 7 into the data newly received. from the first access apparatus in step S4.

As described above, in rewriting the data in the memory 7 of the common memory device 4 into new data, the first access apparatus transmits the data written in the memory 7, the address of the previous data, and the new data to be written in the memory 7. The common memory device 4 reads out the target data from the memory 7 and determines whether it coincides with the previous data from the first access apparatus. Only if these data coincide with each other, the new data is written in the memory 7.

No contention with other access apparatuses occurs when the common memory device 4 rewrites the data in the memory 7. Exclusive control by hardware or software can be omitted. A plurality of memory access apparatuses can rewrite data in the common memory device 4 without complicating the hardware arrangement and software process.

The previous data written by the access apparatuses $1_1$ to $1_n$ are recognized by the access apparatuses $1_1$ to $1_n$ themselves. The access apparatuses $1_1$ to $1_n$ will not accidentally rewrite data not recognized by them. Therefore, the access apparatuses $1_1$ to $1_n$ can reliably update their own data.

The controller 5 in the common memory device 4 finally rewrites the data in the memory 7. The decrease in processing efficiency of the access apparatuses $1_1$ to $1_n$ in data rewrite can be prevented.

Since the flag for preventing the contention with other access apparatuses in rewriting data need not be used, a means for monitoring the set/reset state of the flag need not be used, unlike the conventional case, thereby simplifying the system arrangement.

The presence/absence of the contention is determined when the controller 5 in the common memory device 4 writes data in the memory 7. The influence of contention with other access apparatuses does not act on data write access of the first access apparatus to the common memory device 4. This eliminates a resource for preventing contention. When a plurality of access apparatuses simultaneously output write requests to the common memory device 4, the common memory device 4 may temporarily store these write requests and sequentially process the stored write requests. In this case, each of the access apparatuses $1_1$ to $1_n$ simply outputs its own write request to the common memory device 4. The processing efficiency of each access apparatus in updating data in the common memory device 4 can be increased.

As described above, when previous and new data values P and Q are transmitted from the first access apparatus, as described above, the controller 5 reads out the data from the corresponding address of the memory 7, as shown in FIG. 3A, and the determination means 6 compares the data value P from memory 7, with the previous data value P from the first access apparatus at time ①. In this case, since the two data values coincide with each other, the controller 5 stores the new data value Q at the corresponding address of the memory 7 at the time ②.

Assume that the previous data value P and the new data value Q are transmitted from the first access apparatus, and that the data value at the corresponding address of the memory 7 is a data value R different from the previous data value P from the first access apparatus. In this case, the two data values are determined not to coincide with each other at time ③ in FIG. 3B. Therefore, the new data value Q is not written at time ④, and the contents of the memory 7 are not updated.

As described above, when the data value R different from the previous data value P from the first access apparatus is stored in the memory 7, the controller 5 determines that the data value R is rewritten by any other access apparatus. The data value written by any other access apparatus is not overwritten. For example, in the field of process control, this can prevent a large variation in process by rewriting the previously set data into new data without knowing the previously set data.

When the two data do not coincide with each other, the written data is loaded into an access apparatus and set as the previous data value again. The access apparatus transmits this previous data value again to allow data write access.

What is claimed is:

1. A memory device control method comprising:
    causing a first access apparatus to transmit a first data and a second data together, as a pair of data, and address of the first data to a memory device which stores data corresponding to a plurality of access apparatuses including said first access apparatus, said first data previously written to said memory device and said second data to be newly written data to said memory device;
    determining whether data stored in correspondence with said first access apparatus coincides with the first data when said memory device receives the pair of data;
    allowing writing the second data in said memory device when the data stored in said memory device coincides with the first data, and rejecting to write the second data to said memory device when the data stored in said memory device does not coincide with the first data; and allowing said data stored in correspondence with said first access apparatus to be read from said memory device and set as said first data before said first access apparatus transmits said first data, its address and said second data to said memory device again.

2. A memory system comprising:

a memory device;

a plurality of access apparatuses including a first access apparatus for transmitting a first data and a second data together, as a pair of data, and address of the first data, said first data having previously been written in said memory device, said second data to be newly written in said memory device, said memory device storing data corresponding to said plurality of access apparatuses;

determination means for determining whether data stored in said memory device coincides with the first data when the pair of data are received from said first access apparatus; and control means for writing the second data in said memory device when said determination means determines that the data coincide with each other, and rejecting to write the second data in said memory means when said determination means determines that the data do not coincide with each other;

wherein said data stored in said memory device is allowed to be read and said first data then set to said data stored in said memory device before said first access apparatus transmits said first data, its address and said second data again.

* * * * *